Dec. 16, 1947.   J. K. WENIGER   2,432,757
ASH AND DUST SEPARATOR
Filed June 13, 1945

INVENTOR
Joseph K. Weniger
BY
Augustus B. Stoughton
ATTORNEY.

WITNESS:

Patented Dec. 16, 1947

2,432,757

UNITED STATES PATENT OFFICE 2,432,757

ASH AND DUST SEPARATOR

Joseph K. Weniger, Philadelphia, Pa., assignor to Beaumont Birch Company, Philadelphia, Pa., a corporation of Pennsylvania Application June 13, 1945, Serial No. 599,257

1 Claim. (Cl. 183—84)

From the combustion of solid, powdered fuel there is, in an ash pit, fly ash, dust and the like. It is customary to remove the relatively fine ash, fly ash and dust from the ash pit by means of a pipe or conduit operating under suction or otherwise operated under less than atmospheric pressure.

One object of the present invention is to provide simple, reliable and efficient means for collecting, under suction, such dust, ash, fly ash and the like prior to the disposition of comparatively clean air, gases and the like.

Another object of the present invention is to provide a simple, reliable and comparatively inexpensive ash and dust separator operating under suction.

Another object is to provide such a separator with an ash and dust gate normally closed against atmospheric pressure and opened when loaded and when suction in the apparatus is relieved.

Another object of the invention is to periodically and in cycles of comparatively short duration remove ash, dust and the like from the apparatus.

Other objects of the invention will appear from the following description at the end of which the invention will be claimed.

Figure 2:
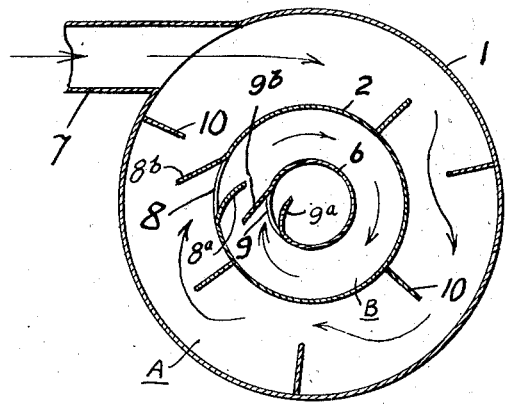
Figure 1:
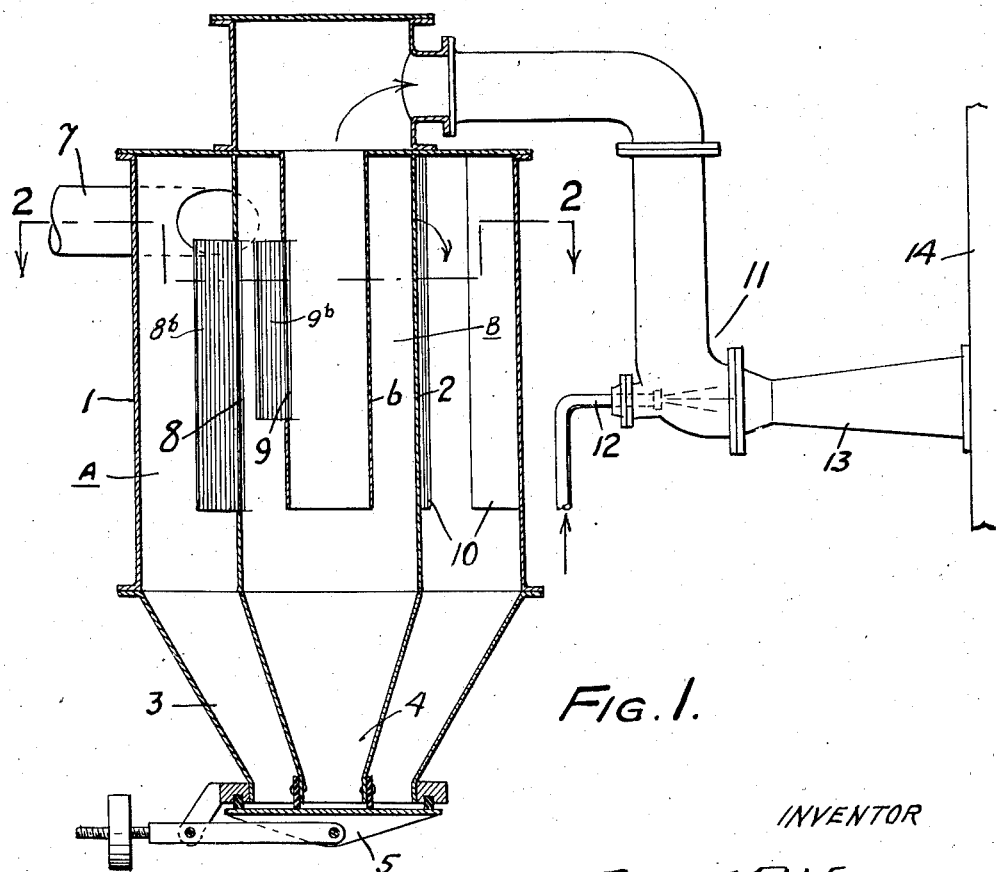

In the following description, reference will be made to the accompanying drawing forming part hereof and in which:

Figure 1 is a vertical, transverse sectional view of a separator constructed in accordance with the principles of the present invention; and Figure 2 is a transverse, horizontal sectional view taken on the line 2—2 of Figure 1.

Referring now more particularly to the drawings, it will be observed that the ash and dust separator of the present invention generally comprises a pair of vertically disposed concentric cylinders 1 and 2 the lower ends of which are respectively fitted with concentric hoppers 3 and 4. Operatively associated with the discharge ends of these hoppers is a hinged closure gate 5 which is common to the discharge openings of both hoppers and is normally held in the closed position shown in Figure 2 by the suction action induced within the separator as the stream of air laden with ash and dust is drawn therethrough.

Disposed concentrically within the inner cylinder 2 is a suction pipe or exhaust conduit 6, the lower end of which terminates well above the horizontal plane of the upper ends of the hoppers 3 and 4. An intake pipe 7 communicates with the interior of the outer cylinder 1 by way of a suitable port formed in the wall of such cylinder adjacent the upper end thereof. It will be noted that the cylinders 1 and 2 and the exhaust conduit 6 form therebetween a pair of annular chambers A and B which are separated from each other by the wall of the inner cylinder 2 and which respectively communicate with the hoppers 3 and 4, in consequence of which ash and dust separated from the air stream while it traverses the outer annular chamber A is deposited within the hopper 3, while ash and dust separated from the air stream during its travel about the inner annular chamber B is deposited within the hopper 4. Any ash and dust which may be separated from the air stream during the course of its travel through the exhaust conduit 6 will likewise be deposited within the inner hopper 4 by way of the opening in the lower end of said exhaust conduit.

Formed in the wall of the inner cylinder 2 is a vertically louvered port 8 of elongated form, formed preferably by striking in a portion 8a of the cylinder wall along one vertical edge of the port opening and securing to the opposite vertical edge thereof an air deflecting louver 8b. Similarly formed in the wall of the exhaust conduit 6 is a vertically louvered port 9, also of elongated form, having an instruck wing 9a along one vertical edge thereof and an air deflecting louver 9b along its opposite vertical edge. It will be noted that the air deflecting louvers 8b and 9b are respectively formed along the outstream edges of the vertically elongated ports 8 and 9 and are so angularly related to the direction of flow of the air stream through the separator as to insure continuous flow of air in maximum volume and high velocity spirally through the separator from the inlet port thereof to the discharge conduit, with the air whirling successively through the annular chambers A and B.

In addition to the air deflecting louvers 8b and 9b, the separator may be internally provided with a plurality of vertically disposed, circumferentially spaced deflector plates or baffles 10, it being noted that these deflector plates are so alternately secured in staggered relation to the inner surface of the cylinder 1 and to the outer surface of the cylinder 2 as to conjointly provide a tortuous path of flow through the annular chamber A of the ash and dust-laden air drawn into the separator.

The upper discharge end of the exhaust conduit 6 is suitably connected to an air discharge conduit 11 which suitably includes therein a steam injector 12 and an associated Venturi tube 13 for inducing a suction pull in the conduit 11 sufficient to draw ash and dust-laden air into and through the separator for eventual discharge, free of ash and dust, into a chimney or flue 14.

It is important to note that the louvered ports 8 and 9 are relatively so disposed as to present their lower edges well above the upper ends of the hoppers 3 and 4, the lower edge of the port 9 being elevated above that of the port 8. Also, it will be noted that the disposition of the ports 8 and 9 relatively to each other and to the inlet port 7 is such that the ash and dust-laden air entering the separator must necessarily flow about the major extent of each annular chamber A and B prior to discharge therefrom, thereby producing a whirling motion spirally through the separator within a zone which is spaced well above the upper ends of the hoppers 3 and 4. The vertical limits of this active zone of whirling air is defined by the upper and lower edges of the louvered ports 8 and 9.

In operation of the separator, air, laden with ash and dust, is drawn into the separator by the suction produced therein by the steam injector 12 and associated Venturi tube 13 operative within the suction line 11. The centrifugal force of the ash and dust-laden air whirling about the chambers A and B of the separator cause the ash and dust particles to be thrown out of the air stream against the walls of the chambers A and B, the resulting impact slowing the motion of the particles sufficiently for them to drop by gravity into the hoppers 3 and 4 located below the active zone of the whirling air stream. It will be apparent that the heavier particles are mainly separated from the air stream within the outer chamber A, and thus are deposited in the outer hopper 3, while the finer particles are separated from the air stream within the chamber B and inside the exhaust conduit 6 for deposit in the inner hopper 4. While it is not the function of the separator to separate the coarse and fine particles, nevertheless it is important to not that the concentric arrangement of the hoppers 3 and 4 more or less seals off the interior of the inner hopper 4 from the outer hopper so that the finer particles deposited within the inner hopper are not subject to disturbance by the turbulent action of the whirling stream flowing about the outer chamber A. By limiting the air movement to the upper zone of the separator, the ash and dust particles deposited in the hoppers remain undisturbed therein until dumped therefrom upon opening of the bottom gate 5, which latter opens automatically when the vacuum is released in the line 11.

The gate 5 is normally closed and held tightly shut by the pressure of the atmosphere acting upon its outer face against the sub-atmospheric pressure on its inner face due to the suction effect within the interior of the apparatus. In other words, atmospheric pressure at the outer face of the gate holds it closed against sub-atmospheric pressure or suction at the other and inner face of the gate.

The gate 5 is counter-balanced and it is normally closed by the suction effect in the interior of the apparatus. However, the load on the gate and the release of the suction effect in the apparatus opens the gate and dumps its load but, if some of the residue of the load should remain, the succeeding suction effect in the interior of the apparatus, together with the atmospheric pressure on the outside of the gate, cause it to tightly close.

It may be remarked that the apparatus may be employed throughout a series of cycles of comparatively short duration, measurable in minutes, during which the gate is opened and its load dumped and thereafter the gate is again closed and the normal suction operation continued.

I claim:

In an ash and dust separator of the character described, a pair of vertically disposed concentric cylinders, a vertical exhaust conduit disposed concentrically within the inner one of said cylinders, a pair of concentric hoppers respectively secured to the lower ends of said cylinders, said cylinders and conduit forming therebetween a pair of annular chambers which are separated from each other by the wall of said inner cylinder and which communicate respectively with said concentric hoppers, the upper ends of said chambers being closed while the corresponding end of said conduit is open for communication with a suction line leading from the separator, the lower ends of said hoppers being normally closed during operation of the separator, an air intake port opening into the outermost chamber adjacent the upper end thereof, and a pair of vertically louvered elongated ports respectively formed in the walls of said inner cylinder and said exhaust conduit with the lower edges of said ports spaced above the upper ends of said hoppers, said louvered ports being arranged relatively to each other and to said intake port as to insure flow of ash and dust-laden air circumferentially about the major extent of each annular chamber prior to discharge therefrom whereby to produce in the separator a whirling motion of the air within a zone the vertical limits of which are defined by the upper and lower edges of said louvered ports, said hoppers being so disposed below the said zone of whirling air as to confine the ash and dust, when separated from the conveying stream of whirling air by the centrifugal force thereof and deposited in said hoppers, within a static zone free from disturbance by whirling air.

JOSEPH K. WENIGER.

REFERENCES CITED

The following references are of record in the file of this patent:

UNITED STATES PATENTS

| Number | Name | Date |
|---|---|---|
| 1,125,032 | Goodell | Jan. 12, 1915 |
| 1,152,125 | Sherwood | Aug. 31, 1915 |
| 1,474,921 | Vreeland | Nov. 20, 1923 |
| 1,781,352 | Tolman, Jr., et al. | Nov. 11, 1930 |
| 1,897,195 | Howden | Feb. 14, 1933 |